(12) United States Patent
Gärtner et al.

(10) Patent No.: US 6,664,531 B2
(45) Date of Patent: Dec. 16, 2003

(54) COMBINED STEREOVISION, COLOR 3D DIGITIZING AND MOTION CAPTURE SYSTEM

(75) Inventors: Hansjörg Gärtner, Sainte-Foy (CA); Dominique Beauchamp, Québec (CA); Yvan Bourassa, Lee Beauport (CA); Martin Breton, L'ancienne-Lorette (CA); Li Song, Boucherville (CA); Guylain Lemelin, Sainte-Foy (CA); Patryck Rouleau, Québec (CA)

(73) Assignee: Inspeck Inc. (CA)

( * ) Notice: Subject to any disclaimer, the term of this patent is extended or adjusted under 35 U.S.C. 154(b) by 0 days.

(21) Appl. No.: 10/277,424

(22) Filed: Oct. 22, 2002

(65) Prior Publication Data

US 2003/0042401 A1 Mar. 6, 2003

Related U.S. Application Data

(63) Continuation of application No. PCT/CA01/00560, filed on Apr. 20, 2001.

(30) Foreign Application Priority Data

Apr. 25, 2000 (CA) .............................................. 2306515

(51) Int. Cl.[7] ............................................ H01L 27/00
(52) U.S. Cl. ................. 250/208.1; 250/559.4; 382/154
(58) Field of Search ........................ 250/208.1, 559.22, 250/559.4, 559.46, 216, 461.2; 348/208.12; 358/462; 382/131, 133, 154, 203, 204; 128/664, 665, 673

(56) References Cited

U.S. PATENT DOCUMENTS

| | | | | |
|---|---|---|---|---|
| 5,142,357 A | * | 8/1992 | Lipton et al. | 348/48 |
| 5,747,822 A | | 5/1998 | Sinclair et al. | 205/559.19 |
| 6,028,672 A | | 2/2000 | Geng | 356/376 |

FOREIGN PATENT DOCUMENTS

| | | |
|---|---|---|
| GB | 2 264 602 | 9/1993 |
| WO | PCT/FR89/00143 | 3/1989 |
| WO | PCT/IB97/01406 | 11/1997 |

* cited by examiner

Primary Examiner—Que T. Le
(74) Attorney, Agent, or Firm—St. Onge Steward Johnston & Reens LLC (57) ABSTRACT

A digitizer combining functions of stereovision, color 3D digitizing and motion capture of a target object. The digitizer has a base supporting two cameras and two projection arrangements with projectors, one of which is provided with a grating element for projection of an encoded pattern on a surface of the target object and used for an active 3D range sensing, the other being used for an acquisition of texture information of the target object. The cameras and the light projectors are angled with respect to each other and arranged so that they have optical axes converging through a single point. A computer operates the projectors and processes the video signals generated by the cameras according to the selected function.

32 Claims, 6 Drawing Sheets

COMBINED STEREOVISION, COLOR 3D DIGITIZING AND MOTION CAPTURE SYSTEM

This application is a continuation of pending International Application No. PCT/CA01/00560 filed Apr. 20, 2001, designating the United States and claiming priority from pending Canadian Patent Application 2,306,515 filed Apr. 25, 2000.

FIELD OF THE INVENTION

The present invention relates to a digitizer combining functions of stereovision, color 3D digitizing and motion capture of a target object, a digitizing system using the digitizer, and associated digitizing and motion tracking methods.

BACKGROUND 3D digitizing, particularly non-contact optical 3D digitizing techniques, have become commercially available during recent years. Most of these techniques are based on the principle of optical triangulation. Despite the fact that passive optical triangulation (stereovision) has been studied and used for many years for photogrammetric measurements, the active optical triangulation technique (particularly laser scanning technique) has gained popularity because of its robustness and simplicity to process the obtained data using a computer. Most of the systems based on the active optical triangulation principle were developed for industrial applications, such as robotics assembly, robot guidance, industrial inspection, reverse engineering, etc. A laser beam or a laser stripe is projected onto a 3D surface of an object, scattering the laser beam or laser stripe on the surface. It is measured using a photo-electronic device. A signal can be measured indicating the position (usually the depth) of the measuring point. In most cases, the basic measurements are either a point or a section profile. A mechanical or optical scanning device is usually used to provide a frame of 3D measurement. Laser is a monochromatic light source that does not provide full color information. So, an additional camera and light source are used when a color texture is needed.

A new category of optical color 3D digitizers, such as the present applicant's product line, has been developed. These systems use structured white light projection combined with a CCD camera allowing for the measurement of 3D geometry and color texture of a surface. The projected structured light (viewed by a camera from an angle different from the light projection) is deformed due to the 3D surface relief. The 3D coordinates of the surface are calculated by analyzing the deformation. These kinds of systems are being used in computer animation, special effects and in electronic game development.

On the other hand, the passive optical triangulation (stereovision, for example) is largely used for the purpose of motion capture. The correspondence problem (automatically finding one point on the object's surface from two optical sensors, cameras in general) is not a major obstacle for this application because only a limited number of points must be measured. These points are often characterized by using visible markers.

Another application of stereovision is stereoscopic 3D display. Instead of determining the 3D coordinates of some points of an object in a 3D space, it simply needs to display a pair of stereoscopic images on a monitor (TV or computer monitor) so that the 3D perspective of an image can be seen. One possible configuration is to capture a pair of images using two cameras, which observe the parallax effect of an object. Then the left eye will view one image of this pair of stereoscopic images and the right eye will view the other. The human brain can easily merge this pair of images so that the object is viewed as a 3D image.

The existing 3D digitizing systems and optical motion capture systems are, in general, complex and too expensive for the Internet and mass consumer applications. Most of these systems incorporate sophisticated optical, electro-optical, mechanical and electronic components. Special expertise is needed to operate such a digitizer. In addition, the existing systems support separately the 3D digitizing and motion capture functions.

SUMMARY

An object of the invention is to provide a digitizer combining functions of capturing stereoscopic images, color 3D digitizing, and motion capture.

Another object of the invention is to provide a system using the digitizer, which is simple in construction, simple to use and affordable for Internet and mass consumer applications like conference via Internet, 3D Web, e-commerce, off-line and on-line games and any application which requires affordable 3D digitizing and/or motion capture solution.

Another object of the invention is to provide methods for digitizing and tracking motion of a target object, which are implementable using a personal computer and simple lighting and video camera components.

According to the present invention, there is provided a digitizer combining functions of stereovision, color 3D digitizing and motion capture of a target object, comprising:
  a first camera;
  a second camera;
  a first projection arrangement having a first light projector providing lighting for an active 3D range sensing for each of the cameras, and a grating element in front of the first light projector for projection of an encoded pattern on a surface of the target object;
  a second projection arrangement having a second light projector providing lighting for an acquisition of texture information of the target object;
  a base onto which the first and second cameras and the first and second projection arrangements are mounted in fixed relative positions with respect to one another, the cameras having optical axes converging through a single point, one of the light projectors having an optical axis intersecting with the optical axes of the cameras at the single point; and
  a communication port connected to the cameras and the light projectors, for reception of control signals setting operation of the cameras and the light projectors and transmission of video signals from the cameras.

According to the present invention, there is also provided a digitizing system comprising a digitizer as above described and a computer having a port connectable with the communication port of the digitizer, functions controlling operation of the digitizer by generating the control signals for the stereovision, color 3D digitizing and motion capture, and functions for a processing of the video signals received through the port and generation of digitized data as a result of the processing.

According to the present invention, there is also provided a method for digitizing a target object, comprising steps of:

capturing basic images of the object with first and second cameras without additional illumination of the object, the cameras having optical axes converging through a single point and being aligned in angled directions with respect to each other so that the cameras have fields of view having significant overlapping portions over a depth of measurement including the single point;

illuminating the object with light in which an encoded pattern is projected;

capturing structured images with the cameras;

illuminating the object with light deprived of a pattern;

capturing texture images with the cameras;

identifying elements of the encoded pattern in the structured images;

determining a position of the elements to produce a set of measured points;

determining 3D coordinates of the measured points using calibration information in respect with position and alignment of the cameras;

determining coordinates corresponding to each measured point in the texture images to produce a digitized image of the object.

According to the present invention, there is also provided a method for tracking motion of a target object, comprising steps of:

capturing in parallel sequences of images of the target object with first and second cameras having optical axes converging through a single point and being aligned in angled directions with respect to each other so that the cameras have fields of view having significant overlapping portions over a depth of measurement including the single point;

detecting control points in a first image of each sequence;

tracking the control points in the sequences of images;

determining disparities between the control points in the images from the first camera and the images from the second camera;

determining 3D positions of the control points in corresponding ones of the images taken at a same time by the first and second cameras by using the disparities and calibration information comprising relative position and angular alignment of the cameras; and generating trajectories of the control points as sequences of the 3D positions of the control points respectively.

Preferably, the system of the invention incorporates elements to capture and transfer a pair of stereo images, to obtain 3D coordinates and the color texture of a surface, and to capture the displacement of a number of given points in a real or quasi-real time. The data capturing process is simplified to make the operation of the digitizer as automatic as possible. With the system according to the invention, the 3D model can be first created with some identifiable control points located on the model surface. Then the 3D position of these control points can be captured in real or quasi-real time, so that the whole model can be controlled or animated.

The cameras can observe disparity created by the active light projector. There is also disparity in a pair of images captured by the two cameras. This digitizer can be connected to a computer via a digital port like a USB port, or other standard high-speed connections. The computer controls the cameras and respective light projectors. A snapshot button can be used to launch a 3D measurement process. The digitizer can be mounted onto a rotational table, with the computer directly controlling the rotation of the rotational table. It is also possible to place the target object on the rotational table so that the angular position of the rotated object can be known.

Preferably, the system provides at least three functions.

First, a pair of cameras can capture a pair of stereoscopic images at video rate. The stereo 3D image can be created when these two images are displayed on a monitor, which sends one image to the left eye and another image to the right eye. These images can be transferred via a high-speed link (Ethernet, T1, T3, for example) to another computer.

Second, combining the light projectors and both cameras, the digitizer provides measurement of the 3D coordinates of a surface with texture information. The encoded pattern is projected on the surface of an object by a light projector and both cameras capture the scene. With the surface relief of the object, the projected pattern is deformed from the point of view of the camera. With a careful calibration technique, it is possible to determine the 3D coordinates of some points on this surface by measuring the deformation of the projected pattern. In principle, a combination of one camera and one light projector can carry out the measurement of the 3D coordinates. The use of two or more cameras, which cover a common space, combined with one light projector, provides three major advantages. First, the weighted average values of the 3D measurements obtained by each of the cameras correspond to a better 3D measurement. Second, this configuration overcomes more problems caused by an occlusion effect. Third, the two cameras observe the projected pattern from different views so that a better interpretation of the deformation of the projected pattern on a discontinued surface can be obtained. The measured 3D coordinates can be transferred via a high-speed link to another computer.

The third function is to make a motion capture of a limited number of points in 3D space. When using some markers on a surface, it becomes relatively easy to determine the 3D positions of these points. It is also possible to use some known points on the object, like the features of the skin, lips, eyelids, eyes, etc. Of course, the 3D space observed by the cameras must be calibrated and a disparity of a given point captured by the cameras can be evaluated and its 3D position can be calculated. When the number of points to be measured is low, it is even possible to determine the 3D positions of these points several times per second. This data can be used to control the motion of an object or model. This data can be transferred via a high-speed link to another computer.

Motion tracking, which analyzes the dynamic motion of a subject in a scene captured by any one or both cameras mounted onto a rotational table, can be achieved with the system according to the invention. A servo control may be used to control (in real time) the rotation of the rotational table in such a way that the digitizer can follow the dynamic motion of the subject. A user, either present or at a distance, can also send a command to the computer in order to orient the digitizer to a desired direction. Since the servo control provides the exact position of the rotational table, it is evident that the whole 3D space covered by the digitizer mounted on the rotational table is calibrated as a known geometric space with respect to the digitizer. This function provides the possibility to cover a larger space to perform the three basic functions of this apparatus.

Instead of mounting the digitizer on the rotational table, sometimes, it is convenient to place an object on this table. This configuration simplifies the operation to merge several views of a 3D object to create a complete 3D model. A 3D digitizer can measure the 3D surface of one single view of an object. In order to create a complete object model, it is necessary to capture different views of an object. When the object is placed on the controlled rotational table, the precise position of each view with respect to the other views is known. So it is easy to register several views in a common 3D coordinate system and to merge them to create a complete 3D model.

BRIEF DESCRIPTION OF THE DRAWINGS

A detailed description of preferred embodiments will be given herein below with reference to the following drawings, in which like numbers refer to like elements.

DETAILED DESCRIPTION OF DRAWINGS

Figure 1:
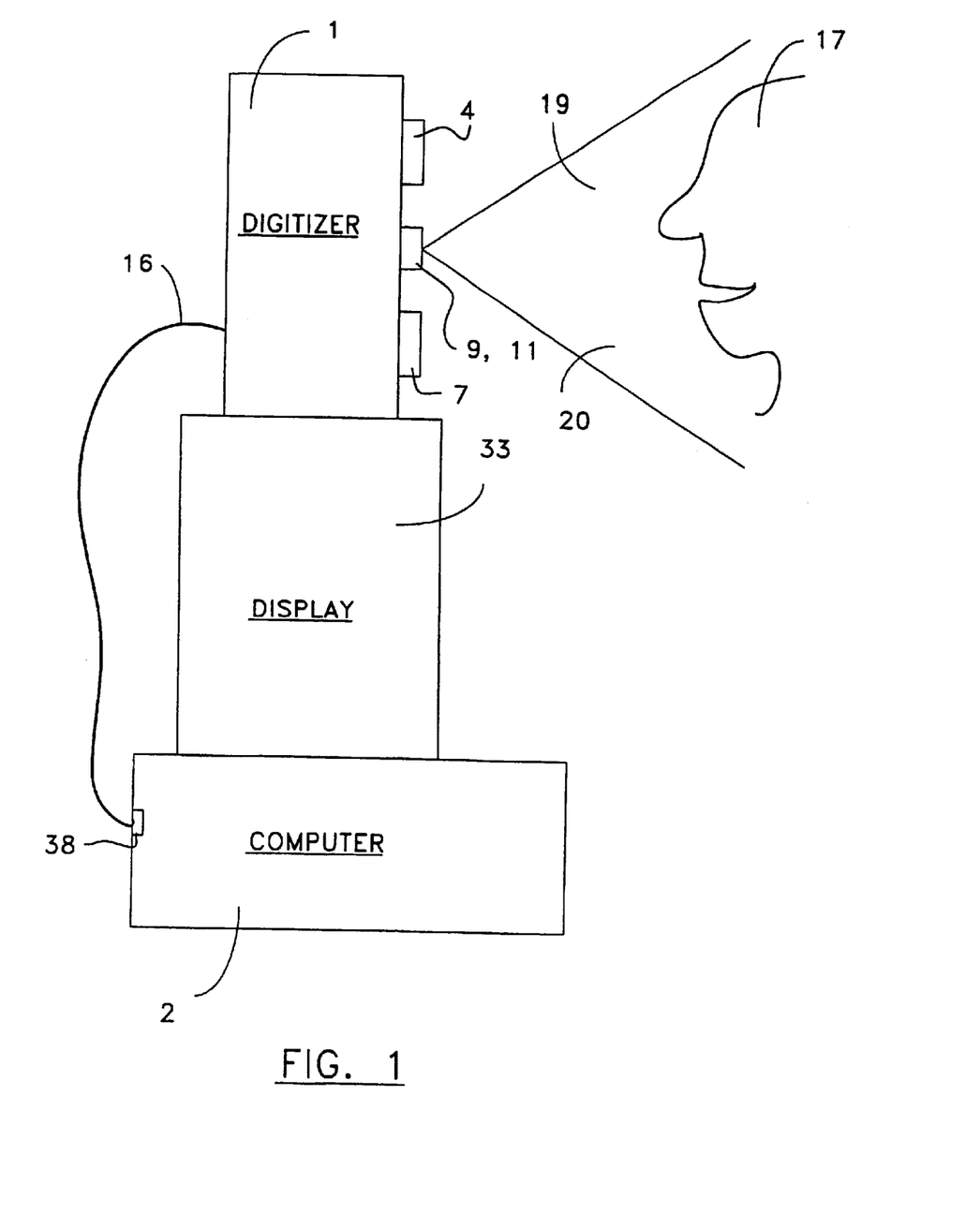
FIG. 1 is a schematic diagram illustrating a possible working environment of a digitizing system according to the invention.
Figure 2A:
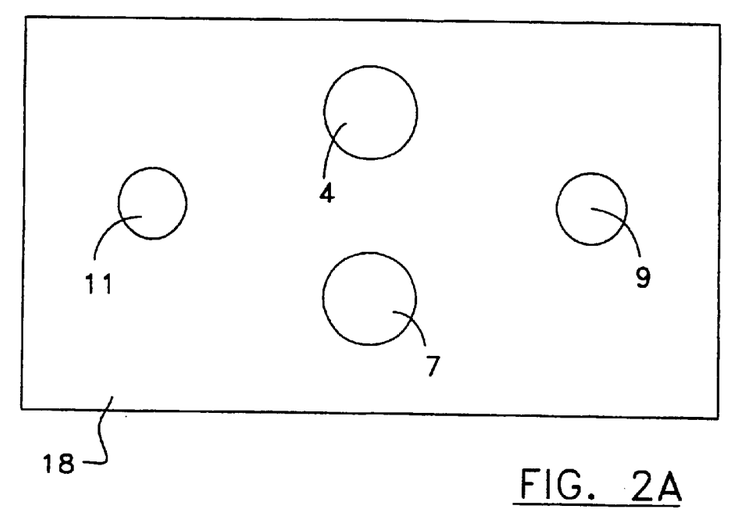
FIG. 2A is a schematic diagram illustrating a front view of a digitizer according to the invention.
Figure 2B:
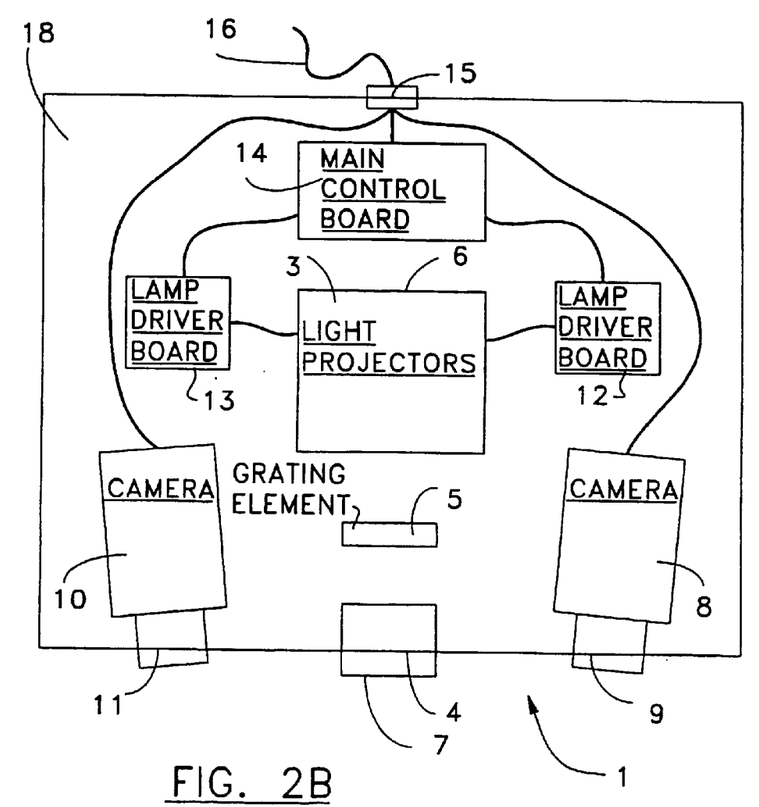
FIG. 2B is a schematic block diagram illustrating a simplified inside view of a digitizer according to the invention.
Figure 4:
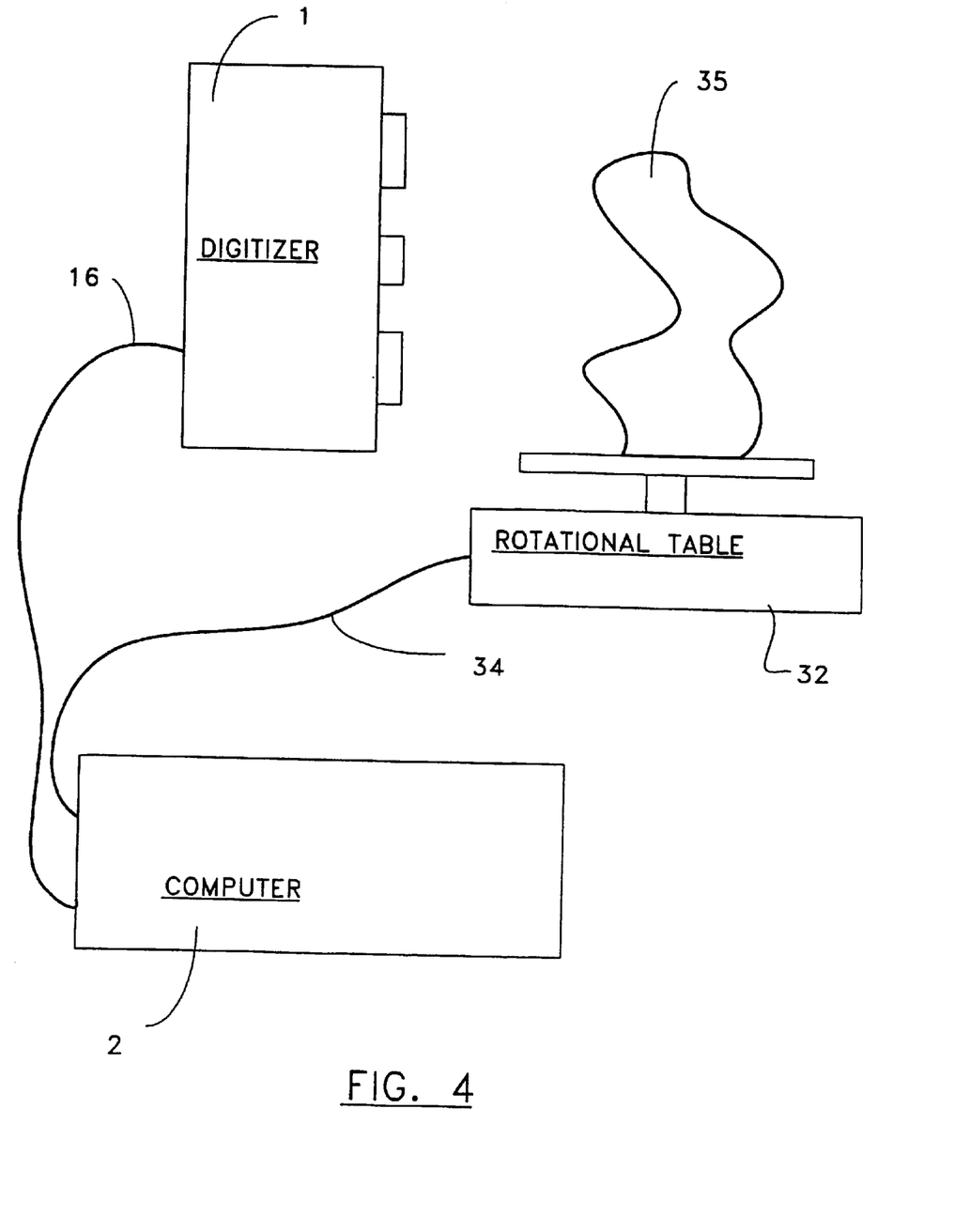
FIG. 4 is a schematic diagram illustrating a digitizing system with a target object placed on a rotational table according to the invention.

Referring to FIG. 2B, there is shown an embodiment of a digitizer 1 combining functions of stereovision, color 3D digitizing and motion capture of a target object, for example an article 35 as shown in FIG. 4 or a human subject 17 as shown in FIG. 1. The digitizer 1 has a first projection arrangement formed of a first white light projector 3 optically coupled with a grating element 5 in front of the projector 3 for projection of an encoded pattern in the light provided preferably through a projection lens 4 and directed on the target object. The digitizer 1 has a second projection arrangement formed of a second white light projector 6 providing lighting without pattern preferably through another projection lens 7. A first color camera 8 preferably with its lens 9 and a second color camera 10 preferably with its lens 11 are arranged preferably next to the projection arrangements. The light projectors 3, 6 can be operated using respective lamp driver boards 12, 13 which are connected to a main control board 14 with a peripheral interface 15, e.g. a USB port. The main control board 14 and the cameras 8, 10 are linked respectively to the port 15 so that signals are communicated to and from a computer 2 by way of a cable 16. The various components of the digitizer 1 are preferably enclosed in a casing 18.

Referring to FIG. 2A, the projection arrangements with the projection lenses 4,7 are preferably positioned vertically one above the other and aligned in angled directions with respect to each other so that the two projected light fields cover each other at a desired distance of measurement. Likewise, the cameras with the projection lenses 9, 11 are preferably positioned horizontally and spaced from each other. As a result, the camera and projection arrangements are positioned symmetrically with each other in a cross-like arrangement.

Figure 5:
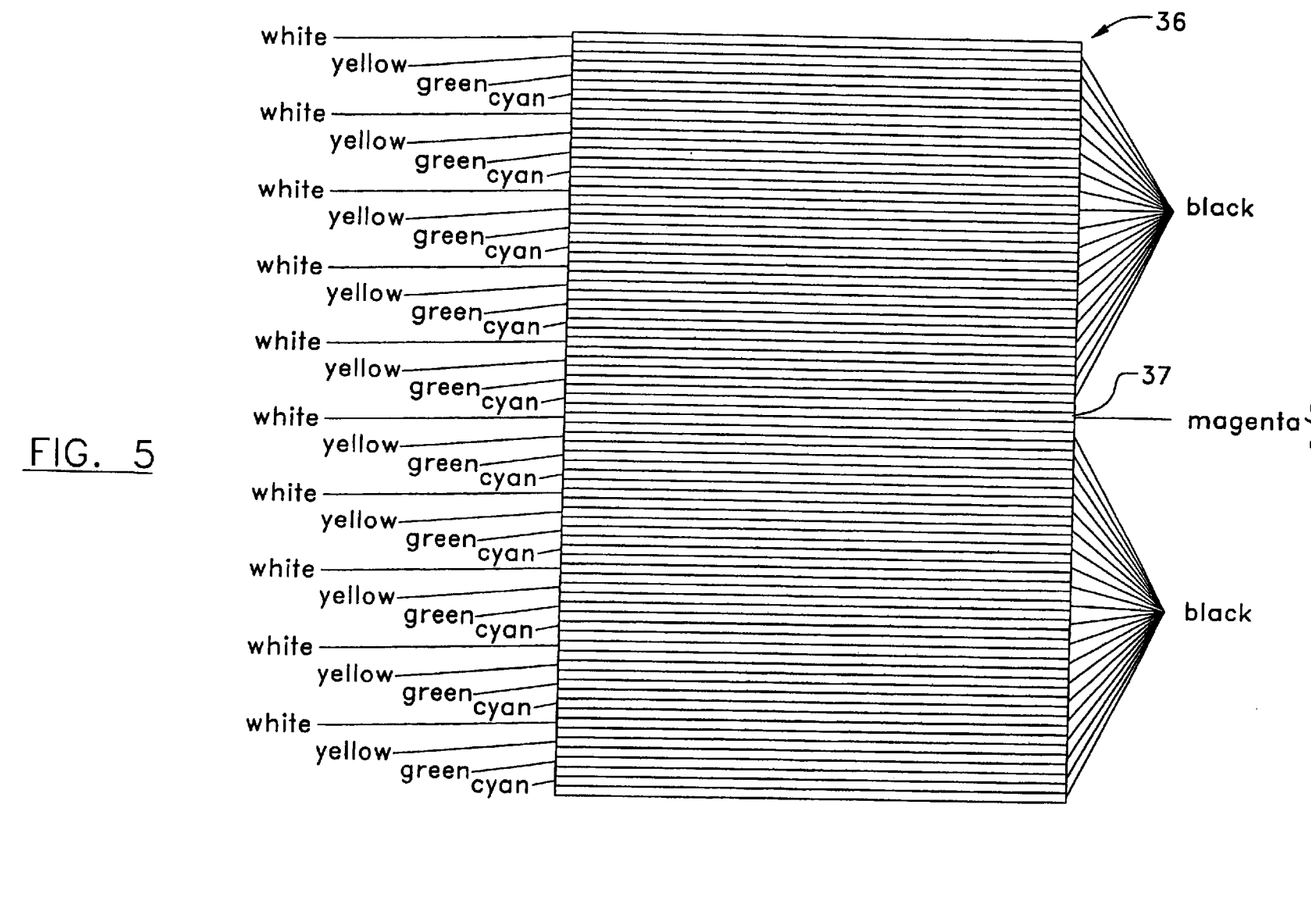
FIG. 5 is a schematic diagram illustrating a possible pattern used in a digitizer according to the invention.

Referring to FIG. 2B, the grating element 5 controllably produces a fringe pattern 36 such as the one illustrated in FIG. 5, in the light projected by the projection lens 4. The cameras 8, 10 are positioned aside from the projection lenses 4 and 7 and aligned in angled directions with respect to each other so that the cameras 8, 10 have fields of view 19, 20 (see FIG. 1) directed on the illuminated surface of the object and maximizing the overlapping with each other over the depth of measurement of the object. The video signals produced on the respective video outputs of the cameras 8, 10 represent complementary images of the object with a common image portion as a result of the fields of view 19, 20 being overlapping. The cameras 8, 10 may be CCD cameras having respective video outputs that are connected to the port 15 preferably accessible on a rear side of the casing 18.

Referring to FIG. 5, the encoded projected pattern 36 consists of a 2D graphic pattern. This pattern is a sequence of color lines. The preferred pattern is a repeating sequence of white, black, yellow, black, green, black, cyan and black. The sequence is for example repeated 10 times. A magenta reference fringe 37 replaces the last black line in the 5th sequence. The orientation of the lines can be vertical, horizontal or any desired angle. The width of the lines can be constant everywhere on the pattern. They can also be variable. The magenta line serves as an identifiable reference fringe having an absolute 3D position determinable in the images captured by the cameras 8, 10, using experimentally predefined functions. The reference fringe 37 is preferably positioned so that each one of the cameras 8, 10 captures it over the entirety of the object 17, 35 (see FIGS. 1 and 4).

Referring to FIG. 2B, the optical axis of the projection lens 4 should be perpendicular to the surface of the projected pattern. The aperture of this lens 4 and its focus should be well adjusted so that the projected pattern will be sharp enough over all the depth of measurement.

The optical axes of camera lenses 9, 11 intersect with the optical axes of the projection lenses 4, 7 at identical distances from the apparatus. These four optical axes intersect at the same point, which is usually referred as the optical center of the apparatus. The angle between the optical axis of the camera 8 and the optical axis of the projection lens 4 determines the sensitivity of the distance measurement, referred to as depth, in the direction of the optical axis of the projection lens 4. The bigger the angle is, the more sensitive the depth measurement will be. On the other hand, the angle should not be too big, in order to keep an overlapped area over the depth of measurement covered by the two cameras 8, 10 at least equal to 80–90% of the field of view 19, 20 of each camera 8, 10. As the projected pattern 36 is a repeating pattern of color lines, it is impossible to differentiate between lines of the same color. Therefore the measurement is without ambiguity only over a certain depth of measurement. The bigger the angle between the optical axes of the projection arrangement and the camera 8, 10 is, the smaller is the depth of non-ambiguity.

Once the digitizer 1 is assembled, the optical and mechanical configuration of the system is fixed. In order to acquire 3D data, the system is calibrated. In the process of calibration, the relationship between the position of the elements of the projected pattern 36 and their distance to the measurement system is determined.

Figure 6:
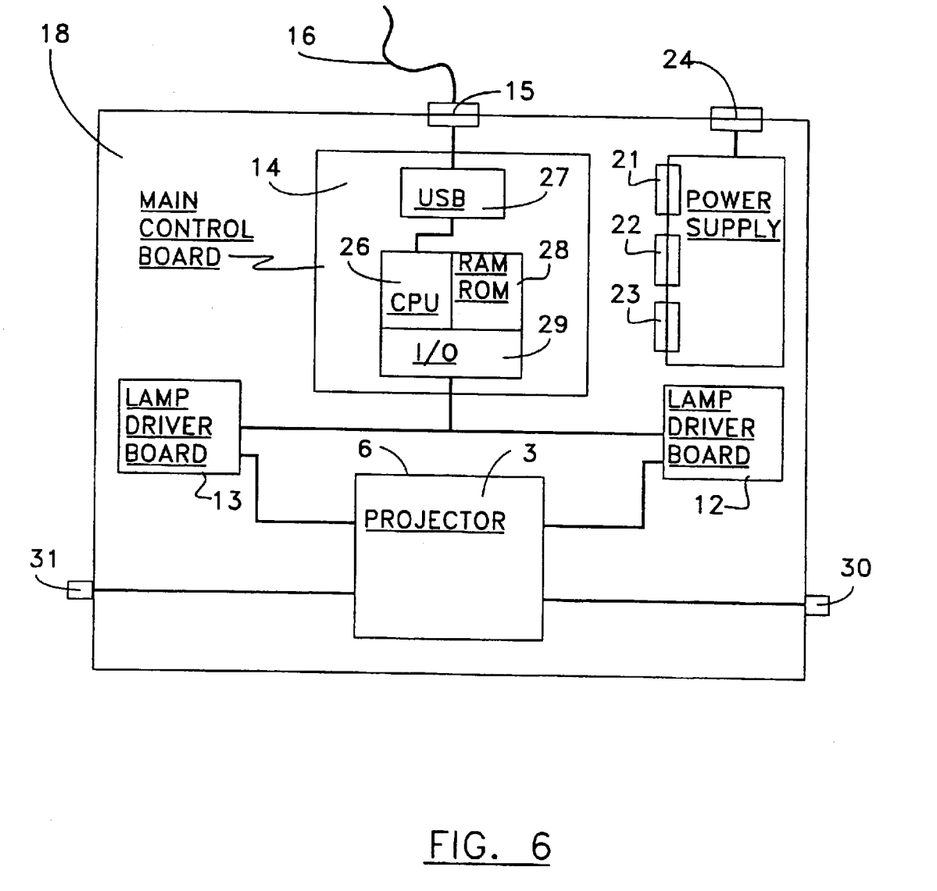
FIG. 6 is a schematic diagram illustrating a possible control system of a digitizer according to the invention.

Referring to FIG. 6, the cameras 8, 10, the light projectors 3, 6 and the main control board 14 of the digitizer 1 can be powered by a power supply with, for example, three outputs 21, 22, 23 providing appropriate voltage levels, the power supply receiving energy through a connector 24 preferably positioned on the rear side of the casing 18.

Referring to FIGS. 1 and 6, a system using the digitizer 1 according to the present invention is provided with a computer 2 with a port 38 for acquiring the video signals coming from the cameras 8, 10 and to send commands from the computer 2 to the main control board 14. The computer 2 will process the video signals coming from the cameras 8, 10. The computer 2 will also initiate a measurement sequence and control the two light projectors 3, 6 in a way that images with a projected pattern 36, without pattern and with uniform white illumination are acquired. The acquisition and projector control are preferably controlled via the main control board 14 by the computer 2 through a cable 16 connected to the port 15.

Preferably, the measurement process for the 3D digitizing is as follows. Images are first acquired with the cameras 8, 10 without illumination. The light projector 3 is then energized in order to generate a pattern projected on the object 17. Images are acquired with the cameras 8, 10 with the projected pattern. The light source of the projection arrangement 3 is then deenergized and the light source of the projection arrangement 6 is energized in order to generate a uniform white light illumination of the measurement space. Images are acquired with the cameras 8, 10 with uniform white illumination. Elements of the projected pattern are identified in the images of the object to be measured with the projected pattern. The position of the elements of the projected pattern is determined in the images of the object to be measured with the projected pattern. This step generates a set of points measured. The 3D coordinates of all measured points are determined using the calibration information. The coordinates corresponding to each measured point in the texture images acquired with the uniform white light illumination are further determined.

For every recording sequence, a set of video images is processed into a suitable software application to retrieve the 3D information from the structured images, along with the texture information. Different algorithms can be used for retrieving the shape and texture information from the video images using projected structured light. Most of these algorithms are based on the identification and localization of the fringes.

The first step of these algorithms will be to detect the projected fringes in the acquired images. Image processing algorithms are used to segment the fringes, which permits to determine for each pixel of the image of which fringe the pixel is a part. Once the fringes are segmented, the position of all fringes in all lines of the image can be determined by finding the maximum intensity of the fringe or by calculating the center of gravity of the intensity distribution of a fringe. If colored fringes are used, the color of each fringe is determined.

The reference fringe 37 (see FIG. 5) encoded into the projected pattern is made uniquely identifiable, preferably by its color. The next step in the 3D digitizing process is the segmentation and localization of the reference fringe 37 in the acquired images. For most lines, the position of the reference fringe is then known. For each line of the image, the fringes are numbered corresponding to their color beginning from the reference fringe to the edges of the image. The color permits to number the fringes correctly as long as the object contains no steps that are larger than the depth of non-ambiguity. The positions of the identified fringes are then converted from real world coordinates into real world units, like millimeters for example. For each camera 8, 10 in conjunction with the light projector 3, a calibration table is created in a separate calibration process. This calibration table permits to convert the measured positions of the identified fringes in 3D coordinates in geometric units.

The conversion function can be:

$$(x,y,z)^T = f(u,j,n)$$

where: $(x,y,z)^T$ are real world coordinates;
n is a number of the identified fringe;
j is a line of the image in which the fringe n is identified; and
u is a position of fringe n in line j.

Once a point cloud is generated based on all the 3D coordinate measurements from a set of images acquired by one of the cameras 8, 10, for each point of the point cloud a color texture vector is determined calculated from the coordinates and the texture image acquired with uniform white light illumination.

The computer 2 may be used to determine the color detected in each pixel of the image obtained with white light projection and, for each pixel, to determine the ratio of each of the red, green and blue color channels to the maximum of the three channels. Color enhancing can then be achieved by applying the inverse of these ratios to the corresponding pixels in the image obtained with the structured light projection.

This process of 3D digitizing is executed for the camera 8 and the camera 10 generating two independent 3D models. In a final step, these two models can be merged. The relative position of the models is well known from the calibration process so the merging of the models and textures can be achieved by using an algorithm of cylindrical projection or cubical projection.

A single full digitized image of the object is thus obtained as a function of the spatial relationship between the real 3D position of the detected fringe maxima in each line of the image with structured light projection and the real 3D position of the structured light projection, the texture image being integrated into the digitized image.

Referring to FIG. 4, when the object to be measured is placed on a rotational table 32 connected to the computer 2 through a cable 34 for the purpose of capturing multiple views, the computer 2 controls precisely the position of the rotation so that the relative position between each view is known. It is very straightforward to put multiple partial models together to create a complete model.

Referring to FIG. 6, the main control board 14 receives commands from and transmits signals to the computer 2 via the cable 16. In the illustrated embodiment, the main control board 14 has a CPU 26, a USB interface 27, RAM and PROM memories 28 for data and program and an Input/Output unit 29. The commands that are recognized by the board are, for example: resetting the digitizer 1; turning the light of the light projector 3 on and off; turning the light of the light projector 6 on and off; and starting the digitizing process.

The lamp driver boards 12, 13 receive on/off signals via the main control board 14. The intensity of the light projector 3, 6 can be manually adjusted with potentiometers 30, 31.

Referring to FIGS. 1 and 2, to perform stereovision display, the images captured by the two cameras 8 and 10 are first transferred to the host computer 2, then a stereo pair of images is calculated, the images being preferably compressed before being sent to another computer (not shown in the Figures). The images received by the second computer will be decompressed if need be and displayed on a monitor screen 33. In order to see a 3D stereo image, one of the two images need to be seen by the left eye and the other image seen by the right eye. This can be accomplished by synchronizing the display of the two images using LCD shutter eyeglasses (not shown in the Figures).

For motion capture function, the disparity observed by the cameras 8, 10 is calibrated in a common 3D space of these cameras 8, 10. The 3D position of a corresponding point captured by two cameras can then be determined. A method for real time disparity measurement is developed to ensure a motion capture of limited points at quasi-video rate.

Figure 3:
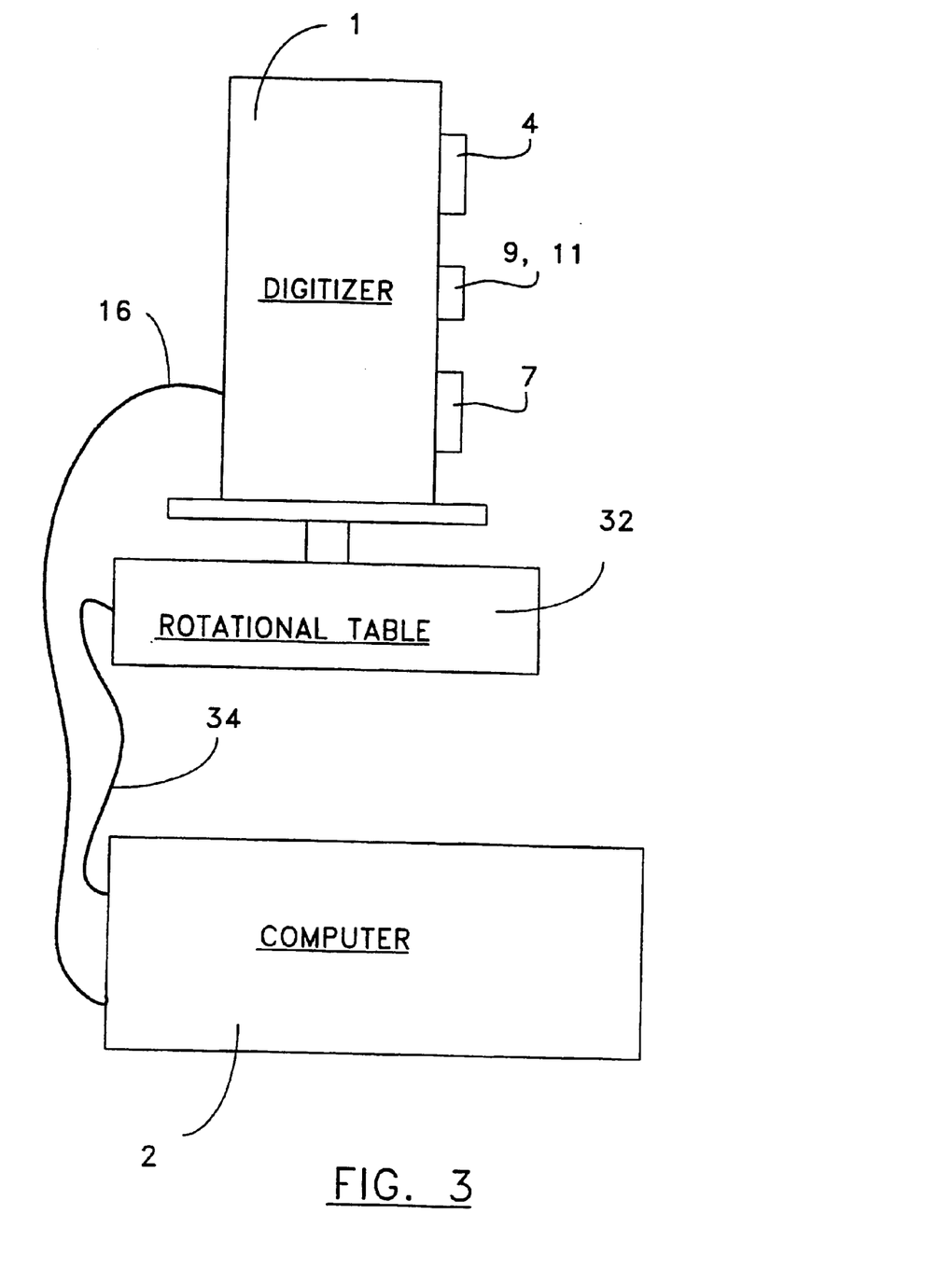
FIG. 3 is a schematic diagram illustrating a digitizing system with a digitizer mounted on a rotational table 32 according to the invention.

Referring to FIG. 3, an object in motion can be tracked. The rotational table 32 controlled by the computer 2 is then used in order to make the digitizer 1 follow the object in motion. The apparatus has a limited measurement space. In order to keep the object in the center of the measurement space, images are acquired by the cameras 8, 10 and transferred to the computer 2. The difference between subsequent video images is determined and used to calculate the displacement of the object. The computer 2 controls the rotational table 32 in order to keep the object in the center of the measurement space.

In the motion capture mode, the computer 2 may operate so that sequences of images in the video signals from the first and second cameras 8, 10 are acquired in parallel. Control points in a first image of each sequence are then detected and tracked in the sequences of images while disparities between the control points in the images from the camera 8 and the images from the camera 10 are determined. 3D positions of the control points in corresponding ones of the images from the cameras 8, 10 taken at a same time are also determined by using the disparities and calibration information involving relative position and angular alignment of the cameras. Trajectories of the control points can be generated as sequences of the 3D positions of the control points respectively. The control points may be formed for example of specific markers positioned on the object or points in the images of the object with high derivatives in intensity.

The computer 2 may have compressing and decompressing functions applicable on the digitized data, and functions for transmitting the digitized data through a communication port of the computer 2.

Although white light is preferred for the projectors 3, 6, other colors may possibly be used depending on the needs. Aperture and shutter mechanisms (not illustrated in the Figures) can be used with the projectors 3, 6. The cameras 8, 10 used in the digitizer 1 may have adjustable gain features if desired.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A digitizer combining functions of stereovision, color 3D digitizing and motion capture of a target object, comprising:
    a first camera;
    a second camera;
    a first projection arrangement having a first light projector providing lighting for an active 3D range sensing for each of the cameras, and a grating element in front of the first light projector for projection of an encoded pattern on a surface of the target object;
    a second projection arrangement having a second light projector providing lighting for an acquisition of texture information of the target object;
    a base onto which the first and second cameras and the first and second projection arrangements are mounted in fixed relative positions with respect to one another, the cameras having optical axes converging through a single point, one of the light projectors having an optical axis intersecting with the optical axes of the cameras at the single point; and
    a communication port connected to the cameras and the light projectors, for reception of control signals setting operation of the cameras and the light projectors and transmission of video signals from the cameras.

2. The digitizer according to claim 1, wherein the first and second projection arrangements are aligned in angled directions with respect to each other so that projected light fields cover each other at a predetermined measurement distance from the projection arrangements, and the first and second cameras are aligned in angled directions with respect to each other so that the cameras have fields of view having significant overlapping portions over a depth of measurement around the measurement distance.

3. The digitizer according to claim 2, wherein:
    the light projectors are white light projectors;
    the cameras are color cameras; and
    the encoded pattern comprises a repetition of a sequence of color lines, one of which being used as an identifiable reference having an absolute 3D position determinable in images captured by the cameras with the lighting provided by the first projection arrangement using experimentally predefined functions.

4. The digitizer according to claim 3, wherein the sequence of color lines comprises white, black, yellow, black, green, black, cyan and black, the black line closest to an optical axis of the first projection arrangement being replaced by a magenta reference line.

5. The digitizer according to claim 1, wherein the first projection arrangement has a projection lens optically coupled with the first light projector and having an optical axis substantially perpendicular to a surface of the encoded pattern.

6. The digitizer according to claim 2, wherein the other one of the first and second light projectors has an optical axis intersecting with the optical axes of the cameras at the single point, the projection arrangements and the cameras being positioned symmetrically with each other in a cross-like arrangement.

7. The digitizer according to claim 6, wherein the first projection arrangement has a projection lens optically coupled with the first light projector, the optical axis of the first camera having an angle with a projection axis of the projection lens, the angle being adjusted so that the overlapping portions equal or exceed 80% of the field of view of each camera.

8. The digitizer according to claim 1, wherein the cameras turn into action and the communication port transfers stereoscopic images captured by the cameras at video rate in response to control data in the control signals associated with the function of stereovision.

9. The digitizer according to claim 1, wherein the first light projector turns on and the communication port transfers images captured by the cameras in response to control data in the control signals associated with the function of color 3D digitizing.

10. The digitizer according to claim 1, wherein the communication port transfers images captured by the cameras in response to control data in the control signals associated with the function of motion capture.

11. The digitizer according to claim 1, further comprising lamp driver boards connected to and controlling respective ones of the light projectors, and a main control board coupled between the communication port and the lamp driver boards.

12. The digitizer according to claim 1, further comprising a casing enclosing the cameras and the projection arrangements, the base being an integral portion of the casing.

13. A digitizing system comprising:
a digitizer combining functions of stereovision, color 3D digitizing and motion capture of a target object, comprising:
a first camera;
a second camera;
a first projection arrangement having a first light projector providing lighting for an active 3D range sensing for each of the cameras, and a grating element in front of the first light projector for projection of an encoded pattern on a surface of the target object;
a second projection arrangement having a second light projector providing lighting for an acquisition of texture information of the target object;
a base onto which the first and second cameras and the first and second projection arrangements are mounted in fixed relative positions with respect to one another, the cameras having optical axes converging through a single point, one of the light projectors having an optical axis intersecting with the optical axes of the cameras at the single point; and
a communication port connected to the cameras and the light projectors, for reception of control signals setting operation of the cameras and the light projectors and transmission of video signals from the cameras; and
a computer having a port connectable with the communication port of the digitizer, functions controlling operation of the digitizer by generating the control signals for the stereovision, color 3D digitizing and motion capture, and functions for a processing of the video signals received through the port and generation of digitized data as a result of the processing.

14. The digitizing system according to claim 13, wherein the functions for the color 3D digitizing comprise a modelling process causing the computer to successively:
acquire basic images in the video signals from the cameras without illumination of the object from the projectors;
acquire structured images in the video signals from the cameras with illumination of the object from the first projector;
acquire texture images in the video signals from the cameras with illumination of the object from the second projector;
identify elements of the encoded pattern in the structured images;
determine a position of the elements to produce a set of measured points;
determine 3D coordinates of the measured points using calibration information stored in the computer; and
determine coordinates corresponding to each measured point in the texture images to produce a digitized image of the object, the digitized data comprising the digitized image of the object.

15. The digitizing system according to claim 14, wherein:
the elements are identified by detecting projected fringes in the structured images, the projected fringes forming the elements of the encoded pattern identified in the structured images, the projected fringes being segmented;
the position of the elements is determined by determining a relative position of the fringes in lines of the structured images by finding a maximum intensity or calculating a center of gravity of an intensity distribution of the fringes, the position of the fringes forming the measured points; and
the 3D coordinates are determined by locating a reference fringe in the structured images based on a distinctive one of features thereof, numbering the fringes according to the feature thereof beginning from the reference fringe to edges of the structured images, converting the relative position of the fringes into real world coordinates in real world units with respect to the reference fringe, and converting the position in real world coordinates into the 3D coordinates in geometric units using a calibration table created in a separate calibration operation for each one of the cameras, the calibration tables forming the calibration information.

16. The digitizing system according to claim 15, wherein:
the distinctive one of the features is a color, the fringes being numbered according to the color thereof;
the converting uses a function:

$$(x,y,z)^T = f(u,j,n)$$

where:
$(x,y,z)^T$ is the position in real world coordinates,
n is a fringe number,
j is a line number in the image for the fringe n, and
u is the position of the fringe n in the line j; and
the coordinates in the texture images are determined by generating a point cloud based on the 3D coordinates from a set of the images acquired by one of the cameras, and determining a color texture vector from the coordinates and the texture images for each point of the point cloud.

17. The digitizing system according to claim 16, wherein the computer further determines for each point of the point cloud a ratio of each red, green and blue color channels to a maximum of the channels, and applies an inverse of the ratios to corresponding points in the structured image.

18. The digitizing system according to claim 16, wherein the modelling process is performed separately on the images from the first and the second cameras respectively to produce two independent 3D models which are later merged together.

19. The digitizing system according to claim 13, further comprising a rotational table controlled by the computer for rotation of one of the digitizer and the object for creation of a textured 3D model of the object, the digitized data comprising the textured 3D model of the object.

20. The digitizing system according to claim 13, wherein the functions for the stereovision cause the computer to calculate a stereo pair of the images for display with a 3D impression of a scene, the digitized data comprising the stereo pair of the images.

21. The digitizing system according to claim 13, wherein the functions for the motion capture cause the computer to:
acquire in parallel sequences of images in the video signals from the first and second cameras;
detect control points in a first image of each sequence;
track the control points in the sequences of images;
determine disparities between the control points in the images from the first camera and the images from the second camera;
determine 3D positions of the control points in corresponding ones of the images from the first and second cameras taken at a same time by using the disparities and calibration information comprising relative position and angular alignment of the cameras; and generate trajectories of the control points as sequences of the 3D positions of the control points respectively, the digitized data comprising the 3D positions and the trajectories of the control points.

22. The digitizing system according to claim 21, wherein the control points comprise specific markers positioned on the object.

23. The digitizing system according to claim 21, wherein the control points comprise points in the images of the object with high derivatives in intensity.

24. The digitizing system according to claim 13, wherein the computer further has compressing and decompressing functions applicable on the digitized data.

25. The digitizing system according to claim 13, wherein the computer further has functions for transmitting the digitized data through a communication port of the computer.

26. A method for digitizing a target object, comprising steps of:

capturing basic images of the object with first and second cameras without additional illumination of the object, the cameras having optical axes converging through a single point and being aligned in angled directions with respect to each other so that the cameras have fields of view having significant overlapping portions over a depth of measurement including the single point;

illuminating the object with light in which an encoded pattern is projected;

capturing structured images with the cameras;

illuminating the object with light deprived of a pattern;

capturing texture images with the cameras;

identifying elements of the encoded pattern in the structured images;

determining a position of the elements to produce a set of measured points;

determining 3D coordinates of the measured points using calibration information in respect with position and alignment of the cameras;

determining coordinates corresponding to each measured point in the texture images to produce a digitized image of the object.

27. The method according to claim 26, wherein:

the elements are identified by detecting projected fringes in the structured images, the projected fringes forming the elements of the encoded pattern identified in the structured images, the projected fringes being segmented;

the position of the elements is determined by determining a relative position of the fringes in lines of the structured images by finding a maximum intensity or calculating a center of gravity of an intensity distribution of the fringes, the position of the fringes forming the measured points; and the 3D coordinates are determined by locating a reference fringe in the structured images based on a distinctive one of features thereof, numbering the fringes according to the feature thereof beginning from the reference fringe to edges of the structured images, converting the relative position of the fringes into real world coordinates in real world units with respect to the reference fringe, and converting the position in real world coordinates into the 3D coordinates in geometric units using a calibration table created in a separate calibration operation for each one of the cameras, the calibration tables forming the calibration information.

28. The method according to claim 27, wherein:

the distinctive one of the features is a color, the fringes being numbered according to the color thereof;

the converting uses a function:

$$(x,y,z)^T = f(u,j,n)$$

where:
$(x,y,z)^T$ is the position in real world coordinates,
n is a fringe number,
j is a line number in the image for the fringe n, and
u is the position of the fringe n in the line j; and the coordinates in the texture images are determined by generating a point cloud based on the 3D coordinates from a set of the images acquired by one of the cameras, and determining a color texture vector from the coordinates and the texture images for each point of the point cloud.

29. The method according to claim 28, further comprising steps of:

for each point of the point cloud, determining a ratio of each red, green and blue color channels to a maximum of the channels; and applying an inverse of the ratios to corresponding points in the structured image.

30. A method for tracking motion of a target object, comprising steps of:

capturing in parallel sequences of images of the target object with first and second cameras having optical axes converging through a single point and being aligned in angled directions with respect to each other so that the cameras have fields of view having significant overlapping portions over a depth of measurement including the single point;

detecting control points in a first image of each sequence;

tracking the control points in the sequences of images;

determining disparities between the control points in the images from the first camera and the images from the second camera;

determining 3D positions of the control points in corresponding ones of the images taken at a same time by the first and second cameras by using the disparities and calibration information comprising relative position and angular alignment of the cameras; and generating trajectories of the control points as sequences of the 3D positions of the control points respectively.

31. The method according to claim 30, wherein the control points comprise specific markers positioned on the object.

32. The method according to claim 31, wherein the control points comprise points in the images of the object with high derivatives in intensity.

* * * * *